United States Patent Office 2,978,499
Patented Apr. 4, 1961

2,978,499

MANUFACTURE OF AROMATIC DISULPHONIC ACIDS

Robert Alexander Edington and Isaac Goodman, Harrogate, England, assignors to Imperial Chemical Industries Limited, London, England, a corporation of Great Britain No Drawing. Filed July 18, 1957, Ser. No. 672,561
Claims priority, application Great Britain July 23, 1956
10 Claims. (Cl. 260—505)

This invention relates to the manufacture of aromatic disulphonic acids, bearing the sulphonic groups in the para-positions or positions analogous thereto.

In processes described hitherto from the disulphonation of benzene, the usual product is benzene 1-3 disulphonic acid. By operating at high temperatures in sulphuric acid solution in the presence of special catalysts only a poor yield of benzene 1-4 disulphonic acid has been obtained. (Behrend and Mertelsmann, Annalen 1911, 378, 352.)

According to the present invention we provide a process for the manufacture of aromatic disulphonic acids bearing the sulphonic groups in the para-positions or positions analogous thereto, in the form of their alkali metal salts by heating the alkali metal salts of the isomeric 1:3 or 2:7 disulphonic acid, according to whether the acid to be isomerised contains one benzene ring or two fused benzene rings, at elevated temperatures preferably in the range of 250° C.–600° C. The heating may take place at either atmospheric or superatmospheric pressures. The reaction preferably takes place in an inert atmosphere such as carbon dioxide or nitrogen although it is not essential that air should be excluded, but when air is present it is desirable that there is only a limited access of air to the reaction vessel.

The isomerisation will take place in the absence of a catalyst at a temperature of 375° C. or above. However, we prefer to operate the process in the presence of a catalyst, as lower operating temperatures can then be used, i.e. temperatures down to the order of 250° C. We have found that substances containing certain heavy metals are very suitable, particularly those containing mercury and chromium. In all cases it is desirable not to operate the process at temperatures above about 600° C., otherwise decomposition of the reactants is likely to occur.

The potassium and sodium salts of the benzene 1:3 or the naphthalene 2:7 disulphonic acids have been found particularly suitable starting materials and of these we prefer to use the sodium salts as in this case the yield of the desired disulphonic acids is somewhat higher than with the potassium salts, and their cost is lower.

It is frequently convenient to isolate the products by liberation of the free disulphonic acids in a crude form. The crude salt products or the free acids may also be converted to chlorides by reaction with, for example, phosphorus pentachloride or thionyl chloride or to the corresponding sulphonamides by reaction with, for example, ammonia.

In addition to the advantage of obtaining the desired acid in high yields, a further advantage arises during the isolation of the desirable product in so far as it is more convenient to separate the desired disulphonic acid from the starting acid when the proportion of the former is high.

The following examples, in which all parts and percentages are by weight, illustrate but do not limit our invention.

*Example 1*

The anhydrous disodium salt of benzene-1:3-disulphonic acid (282 parts) was mixed with mercuric oxide (43 parts) and the mixture was heated in an atmosphere of carbon dioxide at four atmospheres pressure for 6 hours at 425° C.

The product was extracted with water and the filtered extracts were passed through a column of an activated cation exchange resin to liberate the free sulphonic acid, the yield of which, in crude form, amounted to 230 parts. From an aliquot portion of this product was prepared bis(S-benzyl thiuronium)benzene-para - disulphonate (melting point, 247°) in an amount showing that the benzene 1-4 disulphonic acid is obtained in a yield equivalent to 52% of theoretical. The product was further characterized by conversion to benzene-para-disulphonyl chloride which, on reaction with ammonia, gave benzene-para-disulphonamide (melting point, 291°).

*Example 2*

When the anhydrous dipotassium salt of benzene-1:3-disulphonic acid (315 parts) was treated by the method of Example 1, 50 parts (9% of theoretical) of bis(S-benzyl thiuronium)benzene-para-disulphonate were isolated.

*Example 3*

A mixture of disodium naphthalene-2:7-disulphonate (664 parts) and mercuric oxide (43.2 parts) was sealed in an atmosphere of carbon dioxide and heated at 425° for 6 hours. After cooling, the product was extracted with water and an aliquot proportion was treated with an aqueous solution of S-benzyl thiuronium chloride whereby was obtained bis(S-benzyl thiuronium)naphthalene-2:6-disulphonate in a yield corresponding to the presence in the product of at least 15% disodium naphthalene-2:6-disulphonate.

The melting point (271–274° C.) and infra-red absorption spectrum of the salt were identical with those of an authentic sample of bis(S-benzyl thiuronium)naphthalene-2:6-disulphonate.

Naphthalene-2:6-disulphonic acid was readily obtained in the free state as an aqueous solution by contacting the sodium salt solution with a cation exchange resin in the acid form.

*Example 4*

When disodium naphthalene-2:7-disulphonate was treated as in Example 3, using cadmium metal dust (22 parts) instead of mercuric oxide, bis(S-benzyl thiuronium)naphthalene-2:6-disulphonate was obtained in yield equivalent to the presence of 10% of the 2:6-disulphonate in the reaction product.

*Example 5*

When the disodium naphthalene-2:7-disulphonate alone was heated as in Example 3, the yield of bis(S-benzyl thiuronium)naphthalene-2:6-disulphonate was equivalent to the presence of 7% of the 2:6-disulphonate in the reaction product. The same yield was obtained when 41.4 parts of lead powder were added to the disodium salt and the mixture treated as in Example 3.

By comparison when disodium benzene-1:3-disulphonate (820 parts) was heated for 25 hours at 275° C. in an atmosphere of carbon dioxide, the material was unchanged.

*Example 6*

When disodium benzene-1:3-disulphonate (800 parts) was heated for 12 hours at 425° C. in an atmosphere of carbon dioxide, reaction occurred and 720 parts of product were obtained whose composition was disodium benzene-p-disulphonate (70–75%), disodium benzene-m-disulphonate, approx. 5%), trisodium benzene-1:3:5-trisulphonate (approx. 20%) and sodium sulphate (approx. 1–3%).

Example 7

Disodium benzene-1:3-disulphonate (820 parts) was mixed intimately with potassium chrome alum (57 parts), and the mixture was then heated for 24 hours at 275° C. in an atmosphere of carbon dioxide. The product weighed 640 parts, comprising about 85% of disodium benzene-p-disulphonate and about 15% trisodium benzene trisulphonate as estimated by infra-red analysis.

Example 8

Disodium benzene-1:3-disulphonate (820 parts) was mixed with mercuric oxide (43 parts), and the mixture was then treated as in Example 7. The product (760 parts) was disodium benzene-1:4-disulphonate containing about 5% m-disulphonate and about 10% of trisulphonate as revealed by infra-red analysis.

Example 9

Disodium benzene-m-disulphonate (500 parts) and mercuric sulphate (60 parts) were mixed intimately and the mixture was heated in a nitrogen atmosphere for 6 hours at 425° C. The product was worked up as in previous examples, and 450 parts were obtained of disodium benzene-1:4-disulphonate containing a small proportion of trisodium benzene-1:3:5-trisulphonate.

Acids formed by the process of the present invention may be further converted by suitable methods into high molecular weight polymers or converted into terephthalic acid or a derivative such as terephthalonitrile, for example by methods such as are described in, H. Schiff: Ber. 1876, 9, 581 (benzene disulphonate).
R. Ebert and V. Merz: Ber. 1876, 9, 592 (naphthalene disulphonate).
O. G. Doebner: Ann. 1874, 172, 116 (diphenyl-4:4'-disulphonate).

What we claim is:

1. A process for the manufacture of an aromatic disulphonic acid selected from the group consisting of benzene-1:4-disulphonic acid and naphthalene-2:6-disulphonic acid in the form of their alkali metal salts which consists in heating the alkali metal salt of an aromatic disulphonic acid selected from the group consisting of benzene-1:3-disulphonic acid and naphthalene-2:7-disulphonic acid, respectively, within the range 375°–600° C.

2. A process for the manufacture of an aromatic disulphonic acid selected from the group consisting of benzene-1:4-disulphonic acid and naphthalene-2:6-disulphonic acid in the form of their alkali metal salts which consists in heating the alkali metal salt of an aromatic disulphonic acid selected from the group consisting of benzene-1:3-disulphonic acid and naphthalene-2:7-disulphonic acid, respectively, in the presence of a heavy metal catalyst selected from the class consisting of mercury and chromium and at a temperature within the range 250°–600° C.

3. A process according to claim 2, wherein the heavy metal is mercury.

4. A process according to claim 2, wherein the heavy metal is chromium.

5. A process according to claim 1, wherein the alkali metal salt is the sodium salt.

6. A process according to claim 1, wherein the reaction takes place in the absence of air.

7. A process according to claim 5, wherein the reaction takes place in the absence of air and in the presence of an inert gas.

8. A process according to claim 7, wherein the inert gas is carbon dioxide.

9. A process according to claim 7, wherein the inert gas is nitrogen.

10. The process of claim 1, wherein the free acid is obtained from a solution of the alkali metal salt of said aromatic disulphonic acid product by contacting with a cation exchange resin.

References Cited in the file of this patent

Richter: "Textbook of Organic Chemistry," 3rd Edition, page 402 (1952).
Rodd: "Chemistry of Carbon Compounds," volume IIIa, page 239 (1954).
German Patent application H17425 IVb/12o, May 9, 1956.